June 13, 1944.  R. R. BOYLES ET AL  2,350,983
CENTRIFUGAL PUMP
Filed April 10, 1942   2 Sheets-Sheet 2
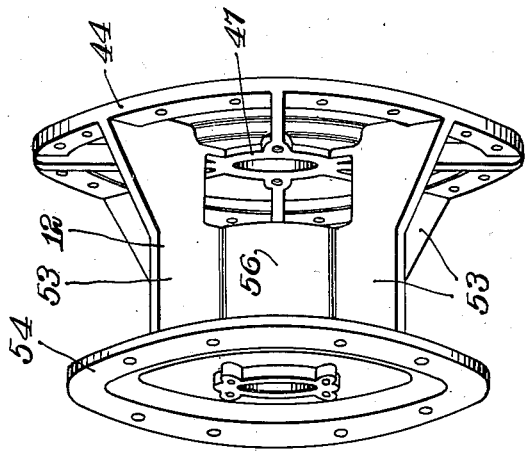
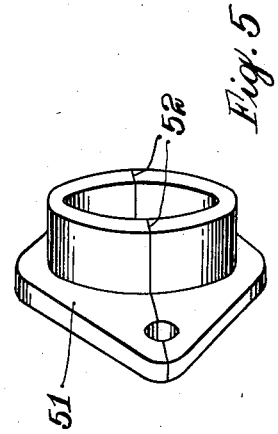
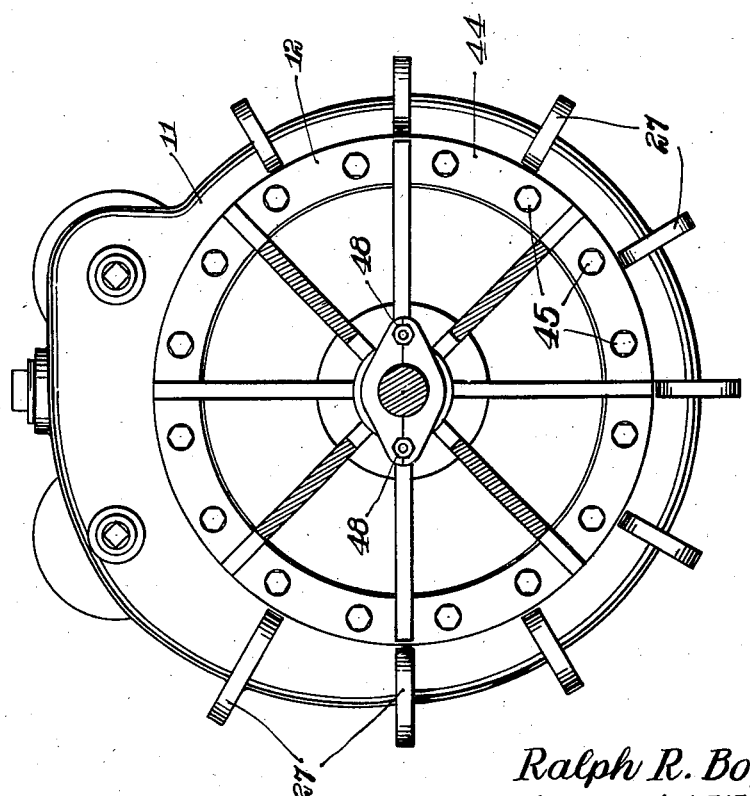
Inventor
Ralph R. Boyles
Edward A. Wilhelm
By Robert M. Dunning
Attorney Patented June 13, 1944

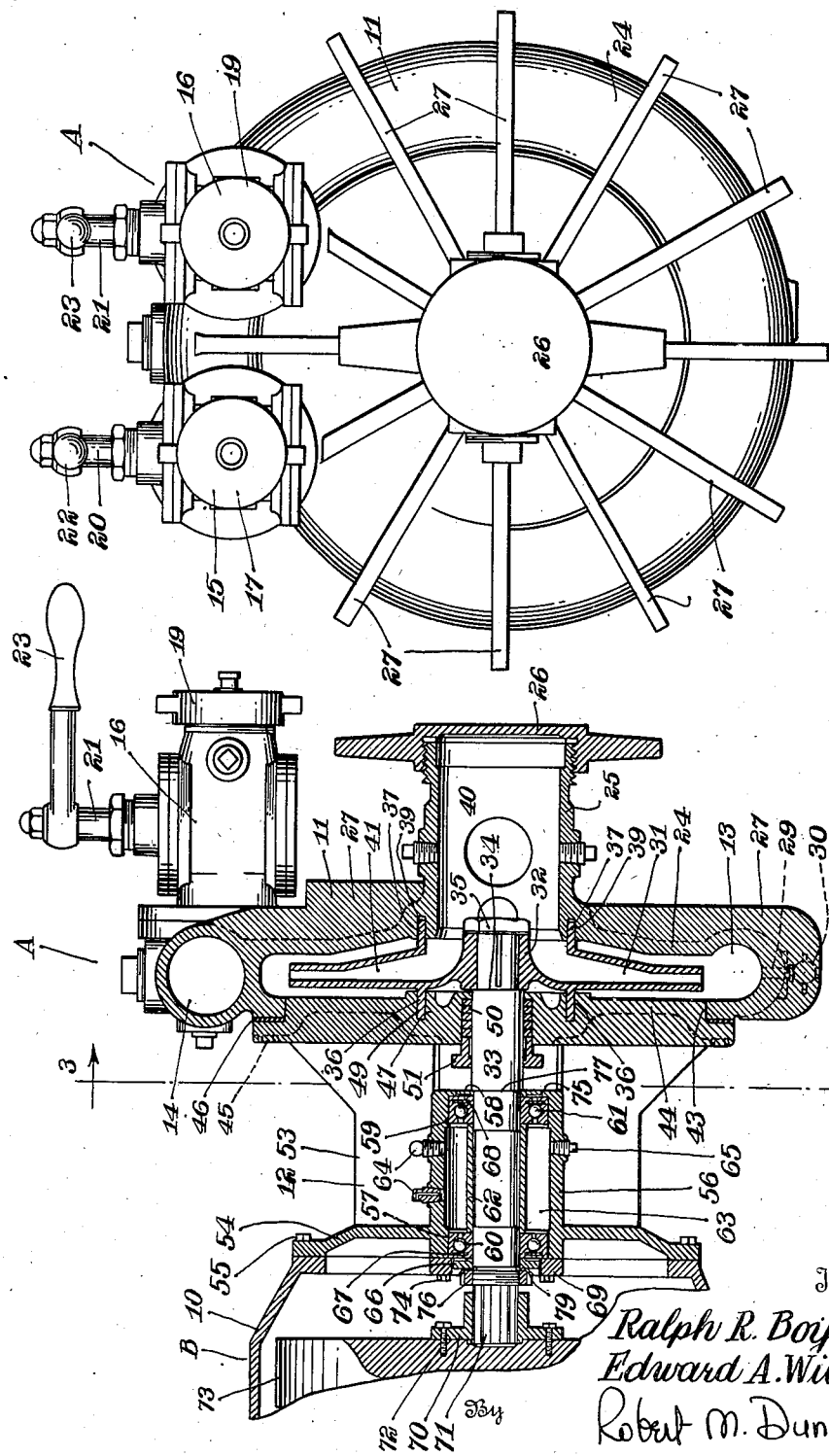

2,350,983

UNITED STATES PATENT OFFICE 2,350,983

CENTRIFUGAL PUMP

Ralph R. Boyles and Edward A. Wilhelm, St. Paul, Minn., assignors to Waterous Company, St. Paul, Minn., a corporation of Minnesota Application April 10, 1942, Serial No. 438,450

6 Claims. (Cl. 103—87)

Our invention relates to an improvement in centrifugal pump, wherein it is desired to provide a simple and efficient pump construction.

In the past, it has been common practice to construct centrifugal pumps with a plurality of castings secured together by bolts or other suitable means. The joints between the various castings must all be carefully sealed to prevent leakage. Air leaks through the pump casing greatly increase the difficulty in priming the pump, particularly when the pump is primed by removal of the air from the pump casing. Furthermore, the castings must be carefully aligned, as the impeller shaft is usually supported by bearings mounted in different castings.

It is the object of the present invention to provide a centrifugal pump having a casing formed in two main parts connected together. One of these parts comprises the impeller casing or volute of the pump, which has an open side to permit insertion of the volute. The other part of the casing acts as a closure for the open side of the impeller casing, and includes the bearings for supporting the impeller shaft. These two casing parts are connected in sealed relation thus providing a single sealed joint through which leakage could occur.

It is an object of our invention to provide a centrifugal pump in which all of the impeller shaft bearings are mounted in a single casting. With such a construction, all of the bearing seats may be machined in exact alignment; and there is no danger of the bearings moving out of alignment during the assembly or repair of the pump. When the bearing seats have been machined, and the bearings mounted in place, the impeller and impeller shaft may be assembled in position. If the impeller shaft rotates freely when installed, there is little danger of the shaft ever binding, as no adjustment is possible between the bearings.

A further feature of the present invention relates to the provision of a pair of impeller shaft bearings mounted in fixed relation within a single casting, and a lubricant reservoir between the bearings. This construction has many advantages. Both of the shaft supporting bearings are lubricated from a single lubricant reservoir, making it possible to properly lubricate the bearings with oil inserted at a single point in the casting. With this construction water is not depended upon as the bearing lubricant for any of the bearings, and as a result the pump may be run either wet or dry without harmful effects. Furthermore, impurities carried by the water into the pump do not injure the pump bearings by causing excessive wear.

An additional feature of the present invention lies in the provision of a pair of impeller shaft supporting bearings and a shaft stuffing box all forming a part of the same casting to permit machining of the same in fixed permanent alignment. The disc or plate designed to close the open side of the impeller casing or volute casing supports a hub within which a stuffing box is provided. This disc or plate also supports a bearing housing coaxial with the hub, and axially spaced therefrom. As a result, the stuffing box is maintained in permanent alignment with the shaft supporting bearings.

A further feature of the present invention is found in the protection of the bearings from water and sand during operation of the pump. The bearings are separated from the interior of the pump casing by a stuffing box; and the bearings are supported within a bearing housing closed at the ends by flinger rings. These flinger rings, together with the bearing shields, effectively prevent entrance of water and sand into the bearing housing.

A further feature of importance in the present construction is found in the provision of a closure plate integral with one of the castings of the pump designed to close the end of the flywheel housing of the engine driving the pump. The casting which supports the impeller shaft bearings and provides a closure for the side of the impeller casing, also includes a closure plate for the end of the fly-wheel housing of the driving engine. As a result, the impeller shaft remains in proper relation to the crank shaft which actuates the same.

These and other objects and novel features of our invention will be more clearly and fully set forth in the following specification and claims.

In the drawings forming a part of our specification:

Figure 1 is a cross-sectional view through the centrifugal pump showing our new construction.

Figure 2 is a front elevation view of the pump.

Figure 3 is a sectional view through the pump supporting casting, the position of the section being indicated by the line 3—3 of Figure 1.

Figure 4 is a perspective view of one of the castings forming the pump.

Figure 5 is a perspective view of a stuffing box nut used in sealing the impeller shaft to the supporting casting.

The pump A is a single stage centrifugal pump particularly designed for operation by an engine such as an internal combustion engine B. The pump A is shown attached to the fly-wheel housing 10 of the engine B in the construction illustrated. Obviously the impeller shaft may be connected in any way to the engine crank shaft or to the fly-wheel of the engine.

The pump A includes two main castings, one of which is indicated in general by the numeral 11, and the other of which acts to support the impeller and to connect the impeller housing to the engine B. This latter casting is indicated in general by the numeral 12, and is best illustrated in Figure 4 of the drawings.

The impeller casing 11 includes a volute 13 which communicates with a discharge passageway 14 which leads to a pair of discharge valves 15 and 16. The discharge valves 15 and 16 are shown closed by the caps 17 and 19, respectively. The valves are controlled by valve stems 20 and 21 which are rotated by valve handles 22 and 23. The liquid being pumped may be forced through either of the valves 15 or 16, or through both of these valves, if it is so desired.

The volute casing or casting 11 includes a disc-shaped front closure plate 24 which communicates with an axial intake or suction passage 25. This passage 25 is shown closed by a cap 26, which is removed when the suction intake is to be supplied with an intake pipe or tube leading from a suitable source of supply of liquid to be pumped. Radially extending reinforcing ribs 27 project from the front surface of the impeller casting to reinforce the same. A drain opening 29 is preferably provided at the lower extremity of the volute casing. A valve 30 controls this drain passage 29 so that the contacts of the pump may be drained when the pump is not in operation.

The impeller 31 is provided with a hub 32 which is keyed to the end of the impeller shaft 33 and which is held against a shoulder 34 in the shaft 33 by the lock nut 35. A circular flange 36 projects rearwardly from the impeller to seal the impeller with respect to the casing in a manner which will be later described in detail. A similar flange 37 projects forwardly from the impeller to extend in a groove 39 in the impeller casing. As the flange 37 is circular and coaxial with the shaft 33 and as the groove 39 is also circular and coaxial with the shaft, a seal is provided between the intake chamber 40 and the interior of the volute 13.

Liquid is driven by rotation of the impeller through the spiral passages 41 in the impeller into the volute 13 which communicates with the discharge openings shown closed by the caps 17 and 19. The rear side of the volute casing is provided with an opening 43 of sufficient diameter to permit insertion of the impeller 31. This opening 43 is closed by means of a closure plate 44 which forms a part of the casting 12, best illustrated in Figure 4 of the drawings. Bolts 45 or cap screws or other suitable means hold the castings 11 and 12 securely together and a gasket 46 between these castings acts to seal the single joint between the two main pump parts.

The closure plate 44 is provided with a hub 47 encircling the impeller shaft 33 and includes a circular groove 49 concentric with the shaft 33 which is designed to accommodate the circular flange 36 on the impeller 31. The extension of the flange 36 into the groove 49 acts to seal the impeller with respect to the closure plate 44, forming a part of the volute casing, and permits high pressure to exist within the volute and a reduced pressure to exist in the pump intake. Packing 50 is provided between a portion of the hub 47 and the shaft 33 and a split stuffing box gland 51 fits into the hub 47 surrounding the shaft 33 to compress the packing 50 when the bolts or cap screws 48 are tightened. As best illustrated in Figure 5 of the drawings, the packing gland 51 is longitudinally split at 52 for ease in assembly so that the gland may be removed and so that the packing can be easily inserted into the stuffing box.

The packing gland 51 fits tightly about the shaft 33 at its outer end, and is relieved slightly at its inner end. The split 52 extends through the bolt holes for receiving the cap screws 48. Tightening the cap screws 48 tends to urge the split halves of the gland 51 together at the outer end of the gland, and tends to urge the split halves of the gland 51 outwardly against the hub 47 at the inner end of the gland.

With reference now to Figure 4 of the drawings, it will be noted that a series of radially extending webs 53 extend rearwardly from the closure plate 44 and terminate in a second closure plate 54 extending substantially parallel to the closure plate 44. The closure plate 54 is normally bolted to the fly-wheel housing 10 by cap screws 55 or other suitable means. A sleeve 56 is provided integral with the closure plate 54 and the webs 53, and this sleeve 56 is axially aligned with the hub 47. As noted in Figure 4 of the drawings, the sleeve 56 terminates short of the hub 47 and the webs 53 are cut out at this point sufficient to allow insertion and removal of the packing gland 51. Thus the packing gland may be operated by the cap screws 48 to properly compress the packing 50 and may be moved longitudinally of the shaft because of the space between the hub and the sleeve 56.

Within the sleeve 56 we provide a pair of spaced bearing seats 57 and 59 designed to support antifriction bearings 60 and 61 in proper alignment and in spaced relation. A spacing sleeve 62, which encircles the portion of the shaft 33 enclosed by the bearing sleeve or housing 56, extends between the bearings 60 and 61, providing a lubricant reservoir 63 between the sleeves 56 and 62, and between the bearings 60 and 61. A lubricant may be inserted into this reservoir through the plugs 64 and when desired the lubricant may be drained through the drain plug 65.

The forward end of the sleeve 56 is closed by a flinger ring 58 mounted on the shaft 33 and a bearing shield 68 internally of the flinger ring 58 further seals the bearing 61. A flinger ring 66 is similarly provided at the rear end of the sleeve 56 and a bearing shield 67 adjacent the flinger ring 66 further seals the bearing 60.

The outer race of bearings 60 and 61 are made to float a little on their respective seats. This is accomplished by providing a ring-shaped retaining element 69 secured to the end of the sleeve 56 by bolts 74, and providing an inwardly extending flange 75 on the forward end of the sleeve. The distance between the opposed faces of the element 69 and the flange 75 establishes the amount the outer races of the bearings 60 and 61 can float.

The inner races of the bearings 60 and 61 are fixed longitudinally on the shaft 33 by the clamping nut 76 and the shoulder 77 on the shaft 33 through the different elements assembled on the shaft. The clamping action of the clamping nut 76 goes through the lock washer 79, the flinger ring 66, the inner race of bearing 60, the separator sleeve 62, the inner race of bearing 61, and the flinger ring 58, clamping these elements against the shoulder 77.

A coupling flange 70 is provided on the splined end 71 of the shaft 33 and this coupling may be secured by cap screws 72 or other suitable means to the fly-wheel 73. Obviously, the shaft 33 need not be secured in this specific manner, the attachment of the coupling 70 to the fly wheel 73 being illustrative of a method of securing the shaft 33 to the crank shaft of the engine. The connection may be effectively made through the use of a well known "Oldham" coupling in place of the connection shown.

The operation of the pump will be clearly understood from the foregoing description. Water is admitted to the pump through the axial intake passage 40 and is drawn through the passages 41 of the impeller by rotation of the same. The discharge of the pump is of course at high pressure and this high pressure is sealed from the intake passage by the flanges 36 and 37.

In the construction of the pump, the bearing seats 57 and 59, as well as the hub 47, may be machined in perfect alignment because all of these parts form a part of the same casting. Thus the shaft cannot bind or seize due to misalignment of its bearings during assembly or repair. The bearing seats, stuffing box, and groove 49 must remain in perfect coaxial relation as they are formed in a single casting, and no adjustment is possible between these elements.

In accordance with the patent statutes, we have described the principles of construction of our centrifugal pump, and while we have endeavored to set forth the best embodiment thereof, we desire to have it understood that obvious changes may be made within the scope of the following claims without departing from the spirit of our invention.

We claim:

1. In a centrifugal pump for use in combination with an engine, a casing including a volute, an axial intake in one side of said casing, the other side of the casing having an opening therein, an impeller in said casing, an impeller shaft on which said impeller is mounted, a closure plate for said opening in said casing through which said shaft extends, a bearing support integral with said closure plate and spaced therefrom, a series of angularly spaced webs connecting said closure plate and said bearing support and spaced from said shaft, a stuffing box encircling said shaft and sealing the joint between the shaft and said closure plate, axially spaced bearing means capable of completely supporting said impeller shaft in said bearing support, and an engine closure plate integral with said bearing support.

2. In a centrifugal pump for use is combination with an engine, an impeller casing including a volute, an intake opening in one side of said casing, an opening in the other side of said casing, a closure plate for said opening, a second plate in spaced parallel relation to said closure plate forming a closure for the engine, radially extending web means integrally connecting said plates, a bearing support between said plates secured to said web means, bearing means of a type capable of completely supporting a stub shaft mounted in said bearing supports, an impeller shaft in said bearing means extending through said plates, and an impeller on said shaft within said impeller casing.

3. In a centrifugal pump for use in combination with an engine having a fly-wheel housing, an impeller casing including a volute, an intake opening in one side of said casing, an opening in the other side of said casing, a closure plate for said opening, a fly-wheel housing closure plate in spaced parallel relation to said closure plate, means integrally connecting said plates, said means comprising a series of radially extending spacing webs, a bearing support between said plates and secured to said webs, bearing means of a type capable of completely supporting a stub shaft mounted in said bearing supports, an impeller shaft in said bearing means extending through said plates, and an impeller on said shaft within said impeller casing.

4. In a centrifugal pump, an impeller casing including a volute, an intake opening in one side of said casing, an opening in the other side of said casing, a closure plate for said opening, a second plate in spaced parallel relation to said closure plate, radially extending web means integrally connecting said plates, a bearing support between said plates of a type capable of completely supporting a stub shaft mounted in said bearing supports, an impeller shaft in said bearing means and extending through said plates, said web means being substantially spaced from said shaft between said bearing support and said closure plate, a stuffing box sealing said closure plate to said shaft, and an impeller within said casing on said shaft.

5. In a centrifugal pump in combination with an engine having a fly-wheel housing, an impeller casing including a volute, an intake opening in one side of said casing, an opening in the other side of said casing, a closure plate for said opening, a second plate in spaced parallel relation to said closure plate, said second plate comprising a fly-wheel housing closure plate, means integrally connecting said plates, a bearing support in spaced relation to said closure plate integral with said connecting means, bearing means of a type capable of completely supporting a stub shaft mounted in said bearing support, a shaft in said bearing means extending through said closure plate, and an impeller on said shaft within said casing.

6. A centrifugal pump in combination with an engine having a fly-wheel housing, said pump comprising an impeller casing including a volute and having an inlet passage in one side thereof and a discharge passage in communication with said volute, said casing having an open side opposite said inlet passage, a closure plate normally closing said open side, a fly-wheel housing closure plate in spaced parallel relation to said closure plate, bearing means of a type capable of completely supporting a stub shaft connected to said fly-wheel housing closure plate, spacing means integral with, and connecting, said plates, a shaft supported by said bearing means, and an impeller in said casing on said shaft.

RALPH R. BOYLES.
EDWARD A. WILHELM.